United States Patent
Gill et al.

(10) Patent No.: US 7,099,123 B2
(45) Date of Patent: Aug. 29, 2006

(54) SELF-PINNED ABUTTED JUNCTION HEADS HAVING AN ARRANGEMENT OF A SECOND HARD BIAS LAYER AND A FREE LAYER FOR PROVIDING A NET NET LONGITUDINAL BIAS ON THE FREE LAYER

(75) Inventors: Hardayal Singh Gill, Palo Alto, CA (US); Wen-Chien Hsiao, San Jose, CA (US); Jih-Shiuan Luo, San Jose, CA (US)

(73) Assignee: Hitachi Global Storage Technologies, Netherlands B.V. (NL)

( * ) Notice: Subject to any disclaimer, the term of this patent is extended or adjusted under 35 U.S.C. 154(b) by 178 days.

(21) Appl. No.: 10/629,323

(22) Filed: Jul. 29, 2003

(65) Prior Publication Data
US 2005/0024784 A1 Feb. 3, 2005

(51) Int. Cl.
*G11B 5/39* (2006.01)
(52) U.S. Cl. ................................. 360/324.12
(58) Field of Classification Search ............ 360/324.12
See application file for complete search history.

(56) References Cited

U.S. PATENT DOCUMENTS

| 5,018,037 | A | 5/1991 | Krounbi et al. |
| 5,583,725 | A | 12/1996 | Coffey et al. |
| 6,146,776 | A | 11/2000 | Fukuzawa et al. |
| 6,252,750 | B1 | 6/2001 | Gill |
| 6,266,218 | B1 * | 7/2001 | Carey et al. ........... 360/324.12 |
| 6,324,037 | B1 | 11/2001 | Zhu et al. |
| 6,344,953 | B1 | 2/2002 | Kautzky et al. |
| 6,348,274 | B1 | 2/2002 | Kamiguchi et al. |
| 6,385,017 | B1 | 5/2002 | Min et al. |
| 6,433,972 | B1 | 8/2002 | Mao et al. |
| 2001/0004798 | A1 | 6/2001 | Gill |
| 2001/0026425 | A1 | 10/2001 | Miyazawa et al. |
| 2002/0024780 | A1 | 2/2002 | Mao et al. |
| 2002/0085323 | A1 | 7/2002 | Smith et al. |
| 2002/0149889 | A1 | 10/2002 | Gill |
| 2002/0154455 | A1 | 10/2002 | Lenssen |
| 2002/0154456 | A1 | 10/2002 | Carey et al. |
| 2002/0154457 | A1 | 10/2002 | Horng et al. |

FOREIGN PATENT DOCUMENTS

JP 11045415 A 2/1999

OTHER PUBLICATIONS

Takahashi, M., Maeda, T., Inage, K., Sakai, M., Morita, H., and Matsuzaki, M., "EDS Induced Pinned Layer Reversal in Spin-Valve GMR Heads," *IEEE Transactions on Magnetics*, vol. 34, No. 4., Jul. 1998.

(Continued)

*Primary Examiner*—A. J. Heinz
(74) *Attorney, Agent, or Firm*—Chambliss Bahner & Stophel; David W. Lynch

(57) ABSTRACT

A method and apparatus for enhancing thermal stability, improving biasing and reducing damage from electrical surges in self-pinned abutted junction heads. The head includes a sandwiched hard bias layer having a first hard bias layer coupled to a free layer and a second, anti-parallel hard bias layer disposed away form the free layer to provide a net longitudinal bias on the free layer.

20 Claims, 10 Drawing Sheets

OTHER PUBLICATIONS

Hung, Silas T., Wong, C.Y., Osborn, Mark, Kagaoan, Joel, Zhang, L.Z., and Bordeos, Randy, "A Study of GMR Read Sensor Induced by Soft EDS Using Magnetoresistive Sensitivity Mapping (MSM)."

Liao, C.C.; Ho, C.H.; Huang, R. -T.; Chen, F.-R.; Kai, J.J.; Chen, L.-C.; Lin, M.-T.; and Yao, Y.D., "Thermal Stability Study of the Insulator Layer in NiFe/CoFe/Al$_2$O$_3$/Co Spin-Dependent Tunnel Junction," *Journal of Magnetism and Magnetic Materials*, vol. 239, No. 1-3, pp. 116-119, Feb. 2002.

Cardoso, S.; Freitas, P.P.; de Jesus, C.; and Soares, J.C., "High Thermal Stability Tunnel Junctions," *Journal of Applied Physics*, vol. 87, No. 9, pp. 6058-6060, May 2000.

Cardoso, S.; Freitas, P.P.; Zhang, Z.G.; Wei, P.; Barradas, N.; and Soares, J.C., "Electrode Roughness and Interfacial Mixing Effects on the Tunnel Junction Thermal Stability," *Journal of Applied Physics*, vol. 89, No. 11, pp. 6650-6652, Jun. 2001.

* cited by examiner

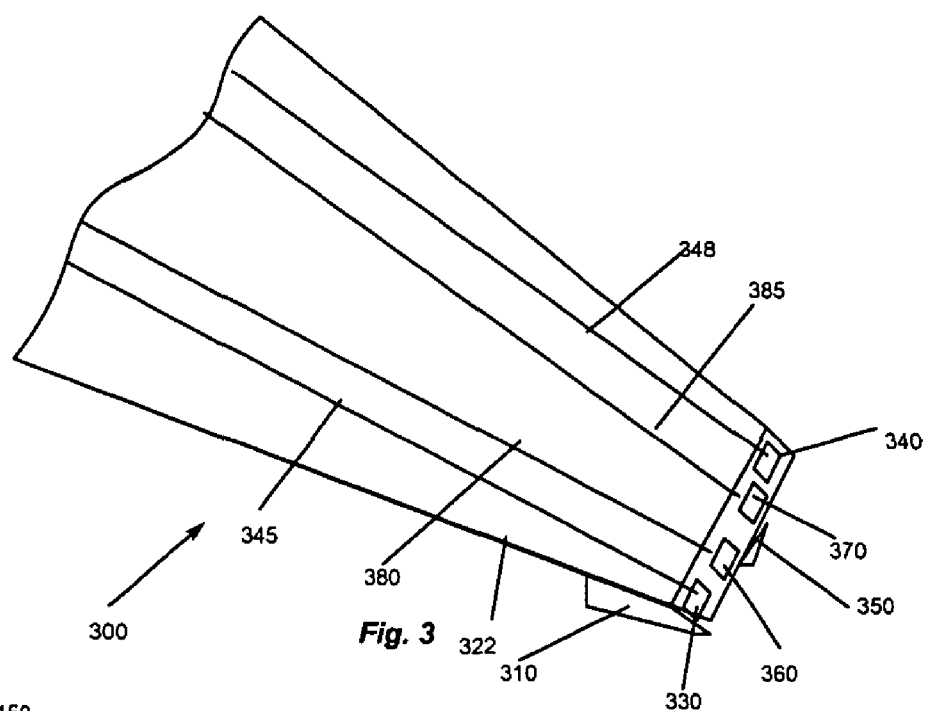
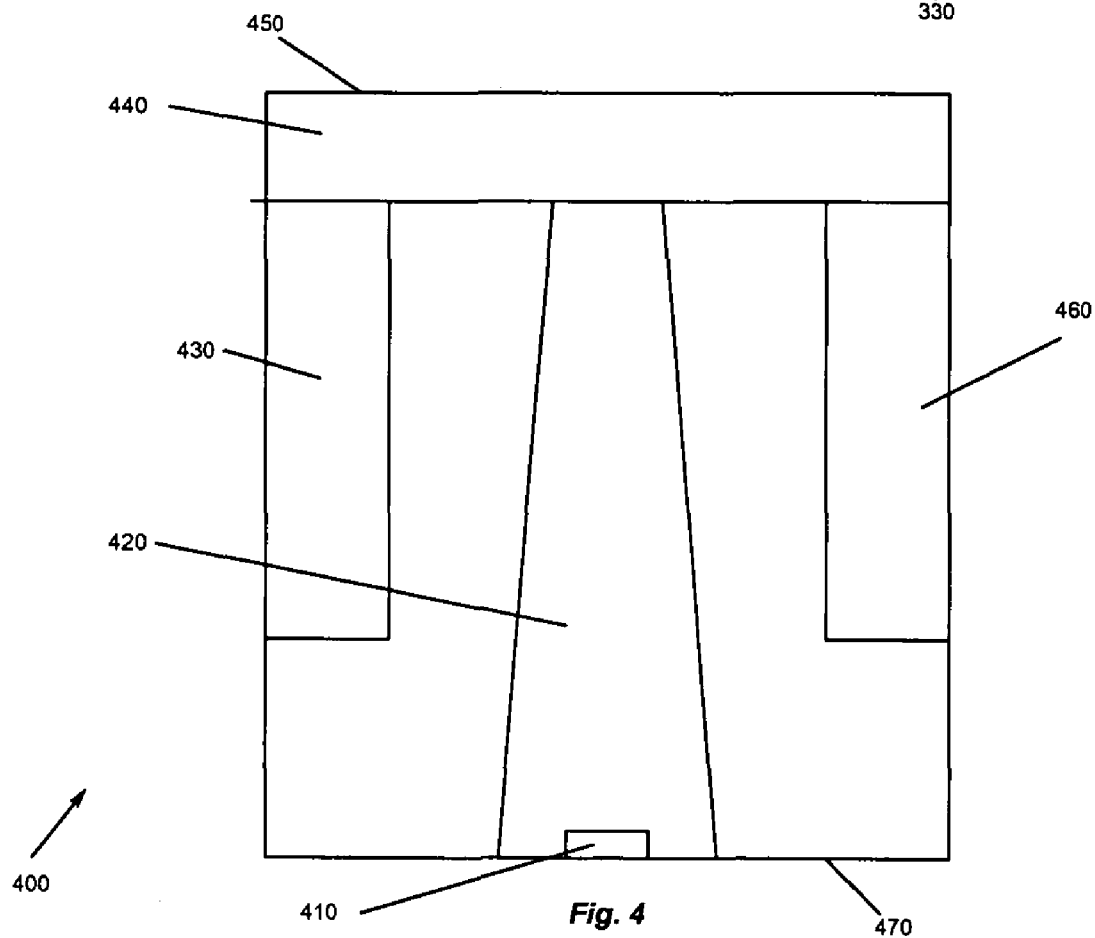

SELF-PINNED ABUTTED JUNCTION HEADS HAVING AN ARRANGEMENT OF A SECOND HARD BIAS LAYER AND A FREE LAYER FOR PROVIDING A NET NET LONGITUDINAL BIAS ON THE FREE LAYER

BACKGROUND OF THE INVENTION

1. Field of the Invention

This invention relates in general to magnetic sensors, and more particularly to a method and apparatus for enhancing thermal stability, improving biasing and reducing damage from electrostatic discharge in self-pinned abutted junction heads.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Areal density continues to grow due to improvements in magnet recording heads, media, drive electronics, and mechanics.

The use of a magnetoresistive (MR) and giant magnetoresistive (GMR) sensors to sense magnetically recorded data has been known for many years. The GMR sensor includes a spin-valve film that provides a high magnetoresistance ratio (MR ratio) as compared with a conventional MR head. The MR ratio is the percentage change in resistance as an external magnetic field is switched between high and low values.

It has also been known that due to spin-orbit coupling, some ferromagnetic materials used in forming a sensor display anisotropic resistivity, i.e. the resistivity being a function of an orientation between a current and a magnetic field. Hence, both traverse bias (i.e., the bias field is perpendicular to a preferred magnetization axis (easy axis—EA) and current direction) and longitudinal bias (i.e., the bias field is along the easy axis and current direction) of an MR structure must be provided to eliminate noise, such as Barkhausen noise, and to maintain the sensor in its most linear operating range.

In the search for new materials that will allow MR heads to be scaled to very small dimensions for increased areal densities and that will also maintain good signal amplitude, scientists have developed films, which exhibit the GMR effect. GMR heads are made up of four layers of thin material that combine into a single structure. A free layer is the sensing layer. The free layer is passed over the surface of the data bits to be read. It is free to rotate in response to the magnetic patterns on the disk. A pinned layer is a layer that is held in a fixed magnetic orientation by its proximity to an exchange layer. The exchange layer is a layer of antiferromagnetic material that fixes the pinned layer's magnetic orientation. A spacer, typically made from copper, is a nonmagnetic layer that separates the magnetization of the free and pinned layers. When the head passes over a magnetic field of one polarity, the electrons on the free layer turn to align with those on the pinned layer, creating a lower resistance in the head structure. When the head passes over a field of opposite polarity, the free layer electrons rotate so that they are not aligned with the electrons on the pinned layer. This causes an increase in the structure's resistance.

To avoid noise, a longitudinal bias field along the current direction of the free layer element is needed. There are two popular longitudinal bias schemes for GMR heads: exchange bias and hard bias. Exchange bias refers to the unidirectional pinning of a ferromagnetic layer by an adjacent antiferromagnet. Ferromagnetic films typically have a preferred magnetization axis, easy axis, and the spin direction preferably aligns along this axis. Hence, there are two equally stable easy spin directions (rotated by 180°) along this axis and it requires the same energy and the same external field to align the spins along either direction.

The ferromagnetic layer may be magnetically pinned or oriented in the fixed and unchanging direction by an adjacent anti-ferromagnetic layer (AFM), commonly referred to as the pinning layer, which pins the magnetic orientation of the ferromagnetic layer (i.e., the pinned layer) through anti-ferromagnetic exchange coupling by the application of a sense current field. Also, the ferromagnetic layer may be self-pinned, in which the magnetic moment of the pinned layer is pinned in a fabrication process, i.e.—the magnetic moment is set by the specific thickness and composition of the film. The self-pinned layer may be formed of a single layer of a single material or may be a composite layer structure of multiple materials. It is noteworthy that a self-pinned spin valve requires no additional external layers applied adjacent thereto to maintain a desired magnetic orientation and, therefore, is considered to be an improvement over the anti-ferromagnetically pinned layer.

In a hard bias scheme, such as abutted junction hard bias, two hard magnets abut at least the free layer along a longitudinal direction. The hard (bias) magnets include a hard magnetic layer such as CoPtCr and appropriate underlayer and/or overlayer for desirable magnetic and electrical properties. The hard magnets are electrically connected to the free layer allowing sense current ($I_S$) to pass through. A magnetostatic field generated by the hard magnets serves the longitudinal bias field ($H_l$).

However, the longitudinal schemes discussed above are sensitive to electrostatic discharge (ESD) and high temperatures produced thereby. Electrostatic discharge can be manifest on giant magneto resistive (GMR) head either physically (e.g., melting of a sensor) or magnetically (e.g., degrading electrical characteristics of a sensor).

Damage to a sensor form ESD occurs in different levels. If the energy level is high enough, ESD will burn and/or melt GMR stripes resulting in bumps on an air-bearing surface (ABS). For example, high ESD energy absorbed at the two ends of an abutted junction of a MR sensor may form bumps, including fractured stripes between the bumps, on the sensor. Also, high ESD energy absorbed along stripes of GMR sensor can melt the sensor forming several micro metal balls. A low ESD energy level may only damage the magnetic structure of an MR sensor (usually call as "soft" ESD).

In addition, the central active area between MR leads and hard bias layers tends to operate at high temperatures. Hence, the added energy from ESD can physically damage the sensor and/or cause unpinning of a pinned layer.

An alternative longitudinal bias scheme is a lead-overlay (LOL) (i.e., overlay hard bias scheme), in which the leads define a trackwidth of a written track. A self-pinned LOL is less sensitive to ESD than the self-pinned abutted junction head, however the LOL head does not provide a desired narrow trackwidth, e.g., below 0.15 um. Therefore, the self-pinned abutted junction head is preferable from an areal density perspective.

It can be seen then that there is a need for a method and apparatus for enhancing thermal stability, improving biasing and reducing damage from electrostatic discharge in self-pinned abutted junction heads.

SUMMARY OF THE INVENTION

To overcome the limitations in the prior art described above, and to overcome other limitations that will become apparent upon reading and understanding the present specification, the present invention discloses a method and apparatus for enhancing thermal stability, improving biasing and reducing damage from electrostatic discharge in self-pinned abutted junction heads.

The present invention solves the above-described problems by providing a self-pinned abutted junction head with a sandwiched hard bias layer having a first hard bias layer coupled to a free layer and a second, anti-parallel hard bias layer disposed away form the free layer to provide a net longitudinal bias on the free layer.

In another embodiment of the present invention, a self-pinned abutted junction head is provided. The self-pinned abutted junction head includes a free layer for sensing magnetic fluxuations, first hard bias layers abutting the free layer and second hard bias layers, formed over the first hard bias layers discontinuous from the free layer, the second hard bias layers being anti-parallel to the first hard bias layers, the first and second hard bias layers providing a net longitudinal bias on the free layer.

In another embodiment of the present invention, a magnetic storage system is provided. The magnetic storage system includes a moveable magnetic storage medium for storing data thereon, an actuator positionable relative to the moveable magnetic storage medium and a magnetoresistive sensor, coupled to the actuator, for reading data from the magnetic recording medium when position to a desired location by the actuator, wherein the magnetoresistive sensor further includes a free layer for sensing magnetic fluxuations, first hard bias layers abutting the free layer and second hard bias layers, formed over the first hard bias layers discontinuous from the free layer, the second hard bias layers being anti-parallel to the first hard bias layers, the first and second hard bias layers providing a net longitudinal bias on the free layer.

In another embodiment of the present invention, another self-pinned abutted junction head is provided. This self-pinned abutted junction head includes first means for sensing magnetic fluxuations, first bias means abutting the first means on opposite sides of the first means and second bias means, formed over the first bias means discontinuous from the first means for sensing magnetic fluxuations, the second bias means being anti-parallel to the first bias means, the first and second bias means providing a net longitudinal bias on the first means for sensing magnetic fluxuations.

In another embodiment of the present invention, another magnetic storage system is provided. This magnetic storage system includes a moveable magnetic storage means for storing data thereon, an actuator positionable relative to the moveable magnetic storage medium and a magnetoresistive sensor, coupled to the actuator, for reading data from the magnetic recording medium when position to a desired location by the actuator, wherein the magnetoresistive sensor further includes first means for sensing magnetic fluxuations, first bias means abutting the first means on opposite sides of the first means and second bias means, formed over the first bias means discontinuous from the first means for sensing magnetic fluxuations, the second bias means being anti-parallel to the first bias means, the first and second bias means providing a net longitudinal bias on the first means for sensing magnetic fluxuations.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a suspension structure for a magnetic head;

FIG. 4 is an ABS view of slider and magnetic head;

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for enhancing thermal stability, improving biasing and reducing damage from electrostatic discharge in self-pinned abutted junction heads. A self-pinned abutted junction heads includes a sandwiched hard bias layer having a first hard bias layer coupled to a free layer and a second, anti-parallel hard bias layer disposed away form the free layer to provide a net longitudinal bias on the free layer.

Figure 1:
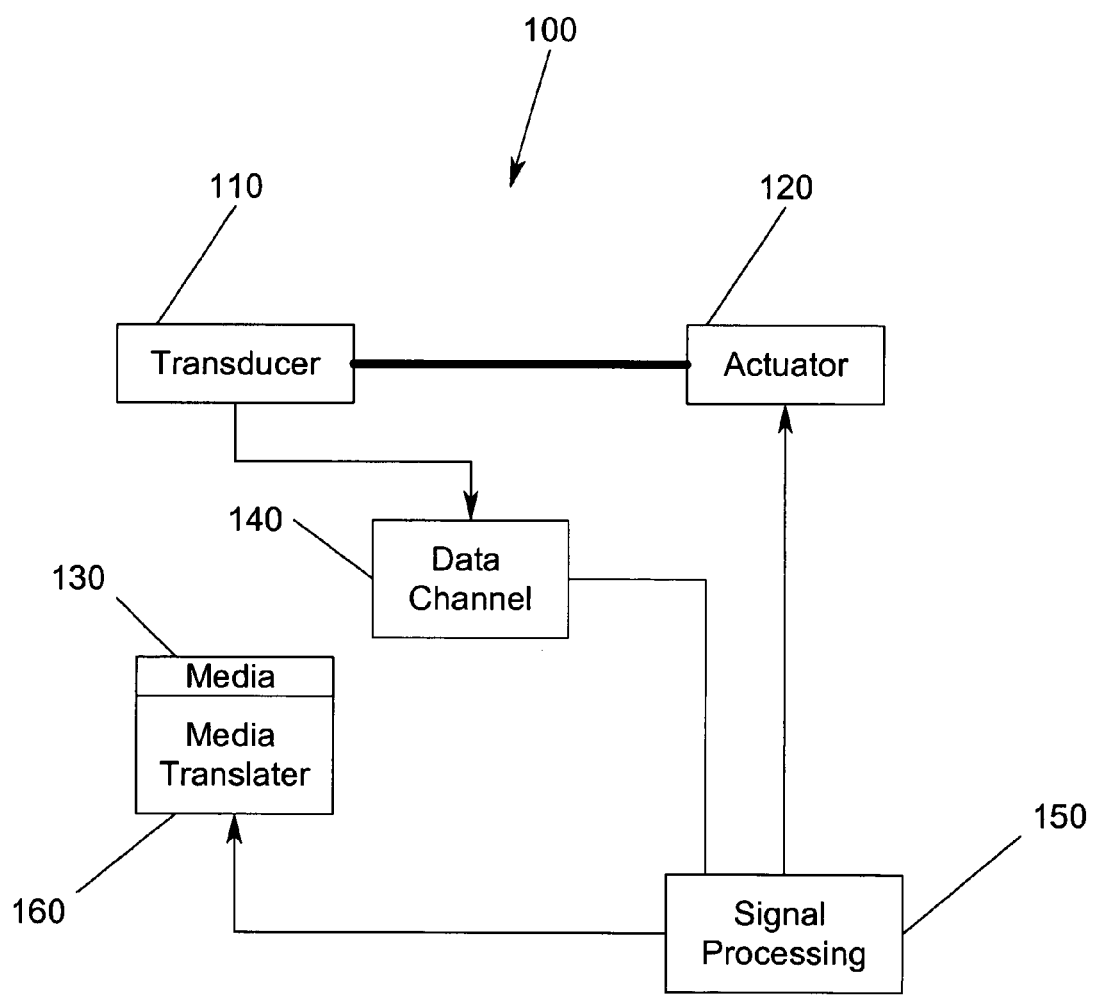
FIG. 1 illustrates a storage system.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
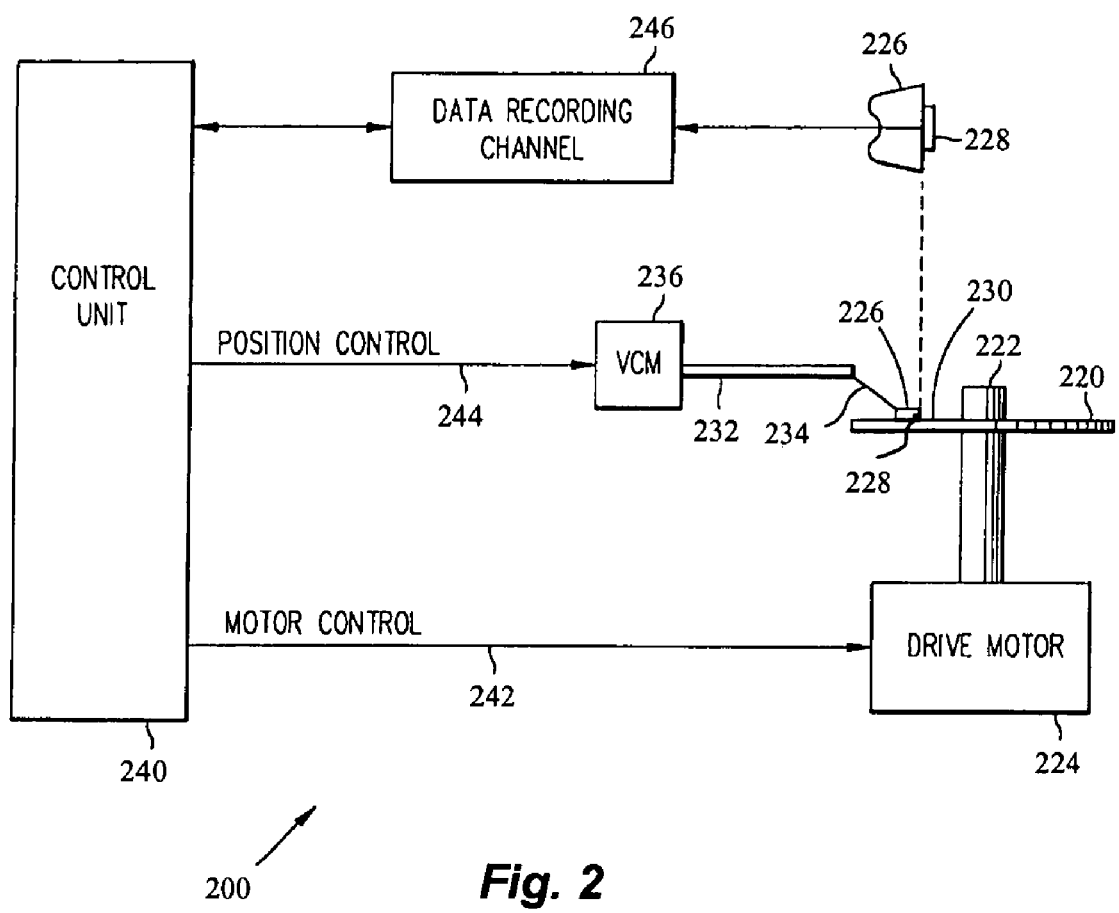
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228, wherein the heads 228 incorporate a sensor of the present invention. As the disk(s) 220 rotate, slider 226 is moved radially in and out over disk surface 230 so that the heads 228 may access different portions of the disk 220 wherein desired data is recorded. Each slider 226 is attached to an actuator arm 232 by means of a suspension 234. The suspension 234 provides a slight spring force, which biases the slider 226 against the disk surface 230. Each actuator arm 232 is attached to an actuator 236. The actuator 236 may be, for example, a voice coil motor (VCM). The actuator 236 is controlled by position control signals 244 supplied by a control unit 240.

During operation of the disk drive 200, the rotation of the disk 220 generates an air bearing between the slider 226 and the disk surface 230, which exerts an upward force or lift on the slider 226. The surface of the slider 226, which includes the heads 228 and faces the surface of disk 220 is referred to as an air-bearing surface (ABS). The air bearing thus counter-balances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals 242 and head position control signals 244. The position control signals 244 provide the desired current profiles to optimally move and position the slider 226 to the desired data track on the disk 220. Read and write signals are communicated to and from the read/write heads 228 through a recording channel 246.

The above description of a typical magnetic disk drive storage system 200 is for representation purposes only. It should be apparent that storage systems may contain a large number of disks and actuators, and that each actuator may support a number of sliders. Many other variations of the basic typical magnetic storage system 200 may be used in conjunction with the present invention while keeping within the scope and intention of the invention. However, those skilled in the art will recognized that the present invention is not meant to be limited to magnetic disk drive storage systems as illustrated in FIG. 2.

FIG. 3 illustrates a suspension structure 300 for a magnetic head. A slider 310 mounted on a suspension 322. First and second solder connections 330 and 340 connect leads from the sensor 350 to leads 345 and 348, respectively, on suspension 322 and third and fourth solder connections 360 and 370 connect to the write coil (not shown) to leads 380 and 385, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of magnetic storage systems, shown in the accompanying FIGS. 1–4, are for presentation purposes only and the present invention is not meant to be limited to the magnetic storage systems illustrated therein. For example, magnetic storage systems may contain a plurality of recording media, such as magnetic tape, and actuators, and each actuator may support a number of sliders. In addition, instead of an air-bearing slider, the head carrier may be one that maintains the head in contact or near contact with the medium, such as in liquid bearing and other contact and near-contact recording devices.

Figure 5:
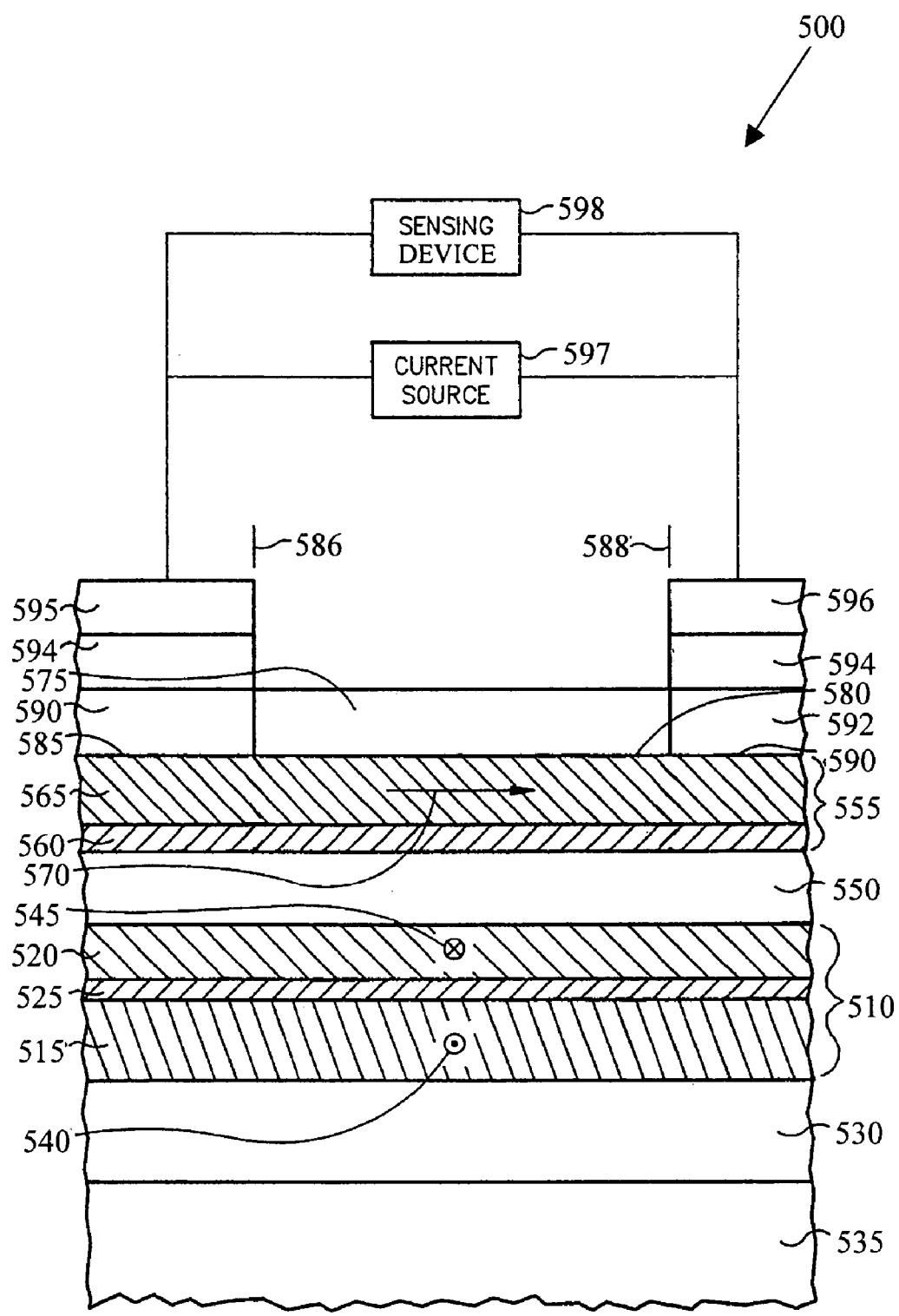
FIG. 5 illustrates one embodiment of a self-pinned laminated lead-overlay structure for a spin-valve sensor.

FIG. 5 illustrates one embodiment of a self-pinned laminated lead-overlay structure 500 for a spin-valve sensor. A pinned layer 510 may include at least two ferromagnetic films 515, 520 separated by a thin anti-ferromagnetic (AFM) coupling film 525. In such a case, as illustrated in FIG. 5, an anti-ferromagnetic layer for pinning a pinned layer is eliminated. The two ferromagnetic films 515, 520 making up the laminated pinned layer 510 are anti-ferromagnetically coupled to one another by means of the appropriate type and thickness of the anti-ferromagnetic coupling film 525 so that the magnetizations of the two ferromagnetic films 515, 520 are oriented anti-parallel to one another.

The spin-valve sensor 500 as shown in FIG. 5 may be fabricated by any acceptable means, such as DC magnetron sputter deposition in the presence of an applied magnetic field. First, a film 530, such as tantalum (Ta), is deposited as a buffer layer onto a substrate 535, such as glass. However, another substrate, such as a semiconductor material or a ceramic material may be used. The pinned ferromagnetic layer 510 may be a self-pinned laminated structure. For example, the self-pinned laminated structure 510 may include a first cobalt (Co) film 515 formed directly on the buffer layer 530, a ruthenium (Ru) film 525 may be then deposited onto the first Co film 515, and a second Co film 520 formed on the Ru film 525.

The easy axes of magnetizations of films 515, 520 are oriented perpendicular to a plane of FIG. 5 (into the paper) due to an applied field. The directions of magnetization of the two films 515, 520 may be set after all films in the spin-valve sensor 500 have been deposited. These magnetization directions are as indicated, i.e., toward the medium for film 515 as shown by arrow 540 and away from the medium for film 520 as shown by arrow 545, however the reverse may also work.

A nonferromagnetic spacer layer 550, such as copper (Cu), may then be deposited onto the second film 520. However, other nonferromagnetic metallic materials with high electrical conductivity, such as silver (Ag), gold (Au), and their alloys, may be used as the spacer layer 550.

Next, a free ferromagnetic layer 555 is formed over spacer layer 550. The free ferromagnetic layer 555 may include a first free layer 560, such as Co deposited on the spacer layer 550, and a second free layer 565, such as NiFe, deposited over the first free layer 560. Both of the layer 560, 565 making up the free ferromagnetic layer 555 may be deposited in the presence of the same applied magnetic field used during the deposition of the pinned films 515, 520 so that this field also defines the easy axis of magnetization of the free layer 555.

Alternatively, the applied field could be rotated 90 degrees from its previous direction. The magnetization direction of the free ferromagnetic layer 555 may be set after all of the films in the spin-valve sensor 500 have been deposited and patterned. This magnetization direction may be as indicated by arrow 570, i.e., generally parallel to the medium and perpendicular to the magnetization directions 540, 545 of the pinned films 515, 520, respectively. It is also possible to form the free ferromagnetic layer 555 to be a single ferfomagnetic material. The film 560 increases the magnetoresistance of the sensor but is maintained relatively thin to minimize the effect of a relatively hard magnetic material, such as Co, on the permeability of the sensor.

Following the deposition of the free ferromagnetic layer 555, a cap layer 575, such as Ta, may be formed over the free ferromagnetic layer 555. Next, the cap layer 575 on top of the central region 580 of the free ferromagnetic layer 555 may be masked. The structure 500 may then be returned to the sputter deposition chamber with an applied field oriented perpendicular to the structure's 500 original direction. The cap layer 575 is then etched down to expose lateral extensions 582, 584 of the free ferromagnetic layer 555. The etching of the cap layer 575 defines edges 586, 588 of the central sensing region 580 of the free ferromagnetic layer 555. The width of the region 580 between edges 586, 588 may be selected to generally match the width of a data track on a magnetic medium.

Anti-ferromagnetic exchange biasing layers 590, 592 may be then deposited directly on the lateral extensions 585, 590 of the free ferromagnetic film 565. This may cause the direction of magnetizations of the extensions 585, 590 to be set perpendicular to their original easy axes. The material used for the layers 590, 592 may then be subjected to an external magnetic field and heated to provide longitudinal biasing of the free layer extensions 585, 590 to fix their magnetizations in the direction of arrow 570.

A second capping layer 594, such as Ta, may then be deposited over the anti-ferromagnetic exchange bias layers 590, 592 to provide corrosion resistance for the structure 500. Other suitable capping materials or high resistivity materials, such as ruthenium (Ru), zirconium (Zr), or alloys of Cu and gold (Au) may be used. Leads 595, 596 may be formed on the second capping layer. A current source 597 may be applied to the leads 595, 596 and measured by a sensing device 598.

After a write head has induced magnetic fields representing bits of data onto a magnetic recording medium, a sensing device 598 is positioned over a desired location of the recording medium. The magnetic fields from the bits induce resistivity changes in the sensing device 598. The sensing device 598 is connected to electronic circuits, and the current flowing through those circuits change with the resistivity changes. The current variations are then detected and decoded to reveal the data that had been stored on the disk.

The self-pinned lead-overlay (LOL) structure 500 is less sensitive to ESD than, for example, a self-pinned abutted junction head. However, the LOL structure 500 does not provide a desired narrow trackwidth, e.g., below 0.15 um. Therefore, improvements in abutted junction type heads are needed.

Figure 6A:
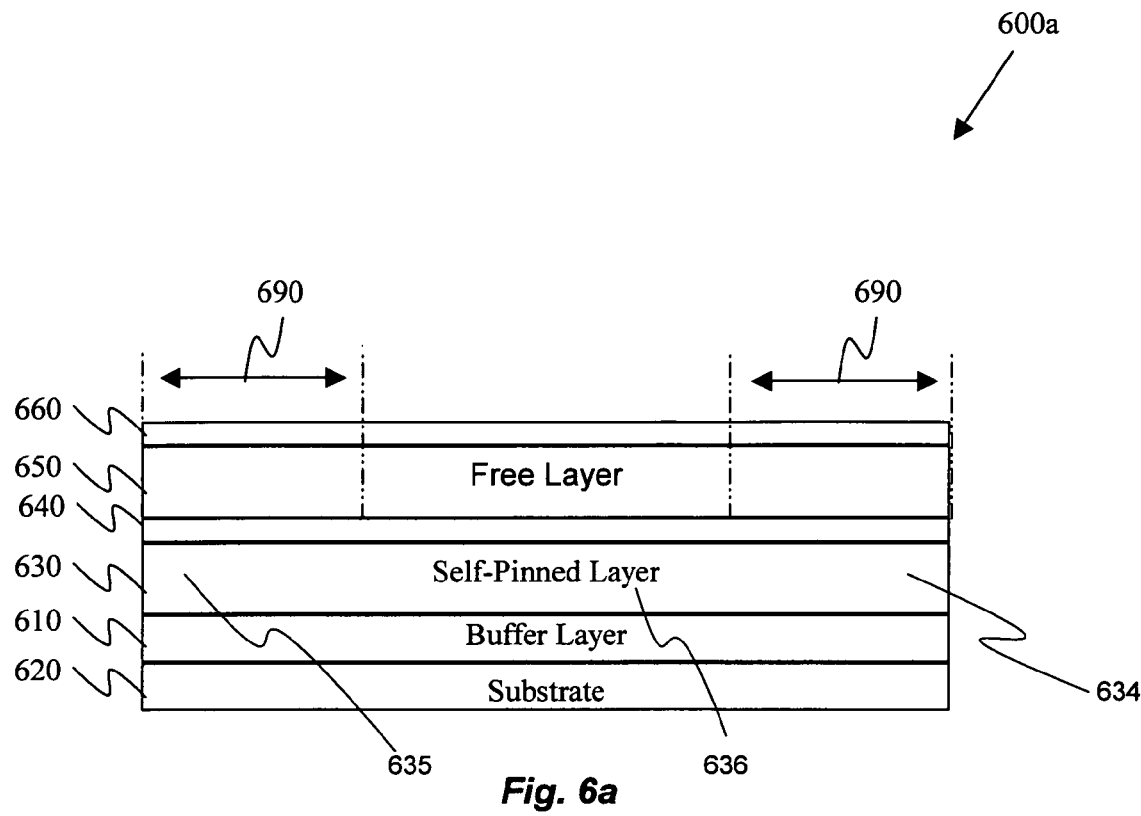
FIG. 6*a* illustrates a self-pinned abutted junction head structure prior to forming a hard bias/lead layer according to the present invention.

FIG. 6a illustrates a self-pinned abutted junction head structure 600a prior to forming a hard bias/lead layer according to an embodiment of the present invention. As discussed in FIG. 5, a first film 610 may be deposited as a buffer layer onto a substrate 620, such as glass. However, the present invention is not limited to this substrate, for example, the substrate could also be semiconductor material or a ceramic material such as used for conventional sliders. A self pinned-layer 630 is formed on the buffer layer 610. The self-pinned layer has a first end 634, a second end 635 and a central region 636. A spacer layer 640, such as copper (Cu), may then be deposited onto the self pinned-layer 630. However, the present invention is not limited to Cu as a spacer layer 640. Next, as discussed in FIG. 5, a free layer 650 is formed on the spacer layer 640 and a capping layer 660 may be formed on the free layer 650.

According to the present invention, a portion of the capping layer 660 on each side of the structure 600 may be removed by any acceptable means, such as by reactive ion etching. The portion of the capping layer 660 is removed such that a hard bias layer of an acceptable size 690 may be form therein; the portion of the capping layer removed extends to the free layer 650. Further, a portion of the free layer 650 on each side of the structure 600 may be removed by any acceptable means, such as by ion milling. Also, the portion of the free layer 650 removed is such that the hard bias layer of the acceptable size 690 may be form therein. The portion of the free layer 650 removed extends to the spacer layer 640.

Figure 6B:
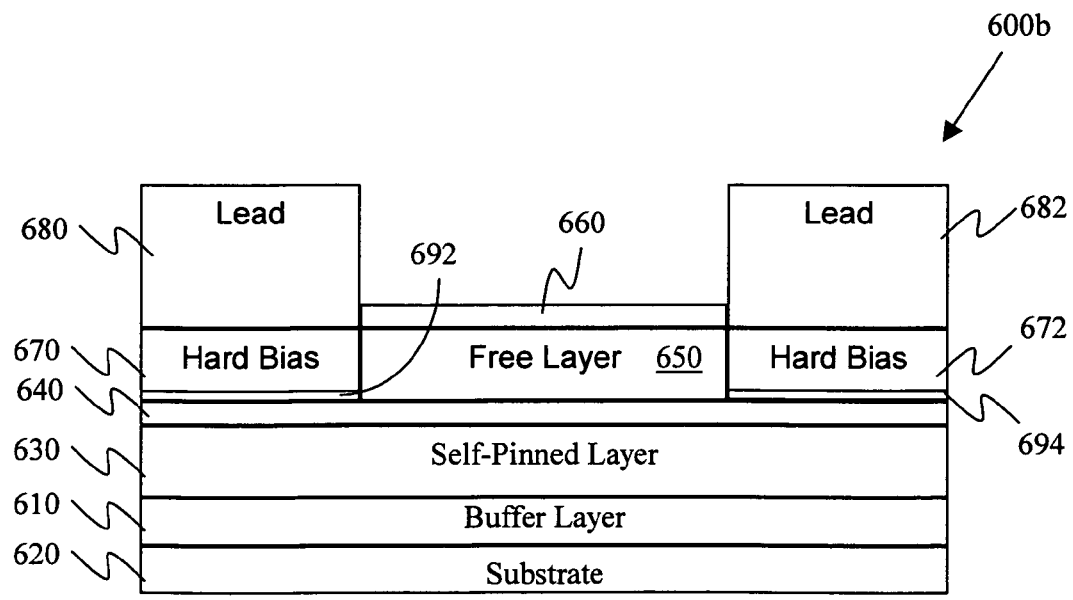
FIG. 6*b* illustrates one embodiment of a self-pinned abutted junction head structure according to the present invention.

FIG. 6b illustrates a self-pinned abutted junction head structure 600b according to another embodiment of the present invention. In FIG. 6b, seed layers 692, 694 are first formed on the spacer layer 640 at each side of the structure 600b. Next, the hard bias layers 670, 672 are formed on the seed layers 692, 694. The hard bias layers 670, 672 then abut the free layer 650. Leads 680, 682 are formed on the hard bias layers 670, 672. The hard bias layers 670, 672 are electrically connected to the free layer 650 allowing sense current ($I_S$) to pass through the free layer. The self-pinned layer 630 extends under the hard bias layers 670, 672 and the free layer 650 disposed between the hard bias layers 670, 672 in the abutted junction head 600b. The free layer 650 is able to dissipate heat due to normal operation and ESD to the cooler operating self-pinned layer 630.

The length of the free layer 650 determines a track width of a written track. Hence, a narrower track width than a conventional longitudinal bias head, such as a LOL head, can be realized (i.e., the active track is defined by the free layer 650 within the leads 680, 682 and hard bias layers 670, 672). Therefore, structure 600b provides higher thermal stability and a narrow track width.

Figure 6C:
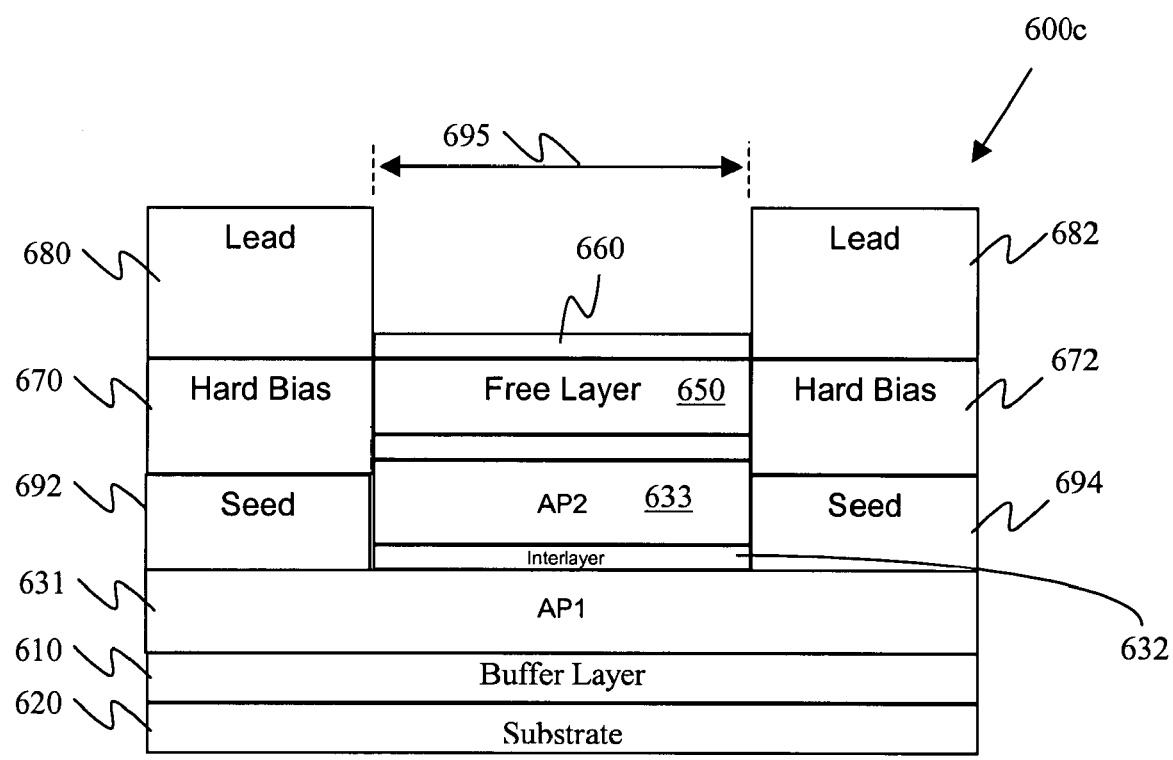
FIG. 6*c* illustrates another embodiment of a self-pinned abutted junction head structure according to the present invention.

FIG. 6c illustrates a self-pinned abutted junction head structure 600c according to another embodiment of the present invention. As discussed above, in a self-pinned layer, the magnetic moment of the pinned layer is pinned in the fabrication process, i.e.—the magnetic moment is set by the specific thickness and composition of the film. The self-pinned layer may be formed of a single layer of a single material or may be a composite layer structure of multiple materials. Further, the self-pinned layer requires no additional external layers applied adjacent thereto to maintain a desired magnetic orientation.

Illustrated in FIG. 6c is an anti-parallel (AP) laminate structure 631–633 that includes first ferromagnetic pinned layer (AP 1) 631 and second ferromagnetic pinned layer (AP2) 633 separated by an interlayer 632. The magnetic orientations of the first and second pinned layers 631, 633 are set to be in opposite directions and the thickness of the ferromagnetic-pinned layers 631, 633 are such that the net magnetic moment of the laminated structure is near zero.

In FIG. 6c, the first ferromagnetic-pinned layer (AP I) 631 is extended beyond the active area under the hard bias 670, 672 and leads 680, 682 layers. This provides stress and temperature relief for the pinned layer (AP2) 633 in the active region 695. Under high voltage surges (e.g., ESD) only the first pinned layer AP1 631, which has portions outside the active area 695, remains at a lower temperature and avoids a pinned layer reversal.

Figure 6D:
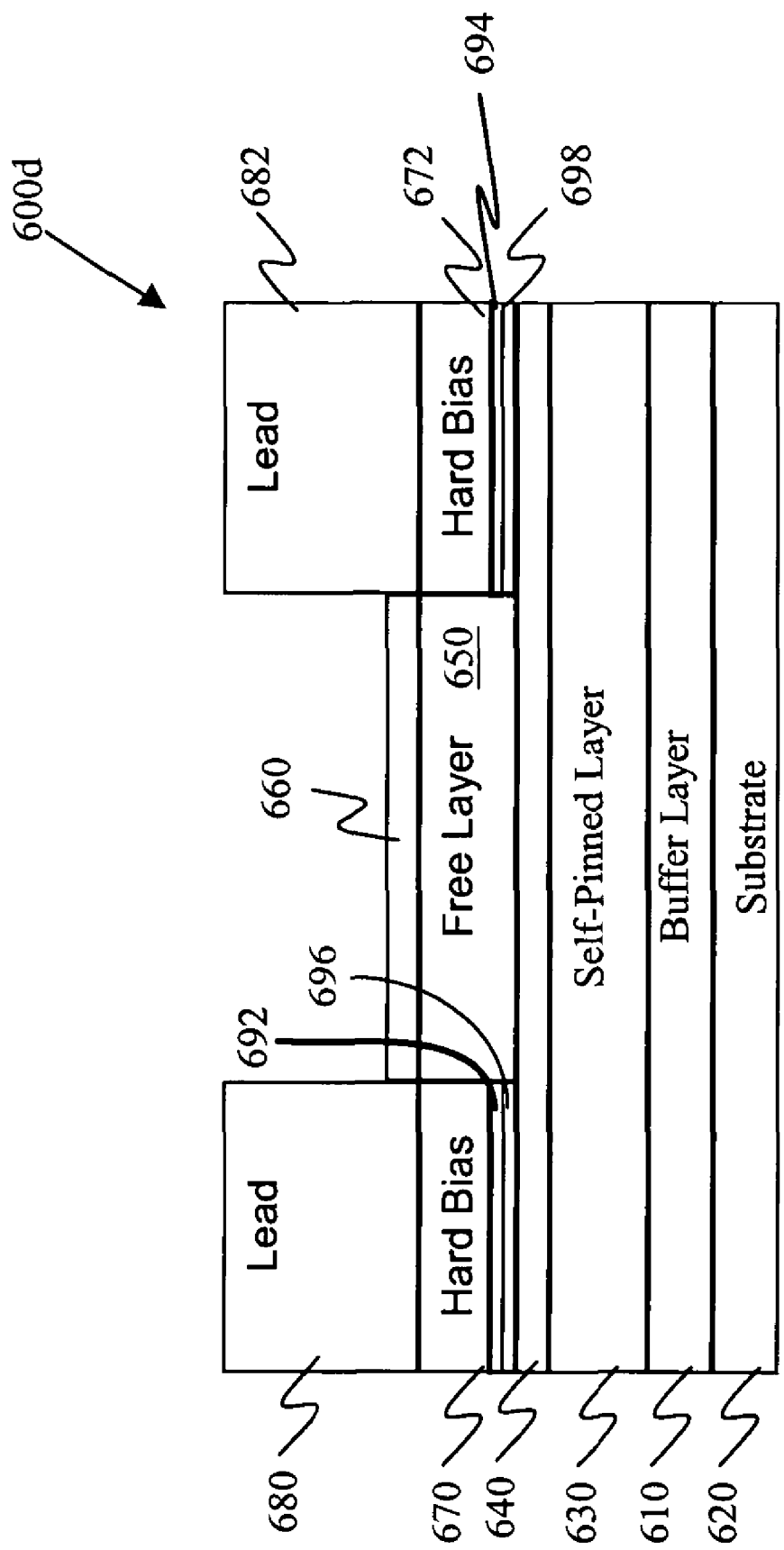
FIG. 6*d* illustrates a self-pinned abutted junction head structure according to another embodiment of the present invention.

FIG. 6d illustrates a self-pinned abutted junction head structure 600d according to another embodiment of the present invention. In FIG. 6d, amorphous layers 696, 698 are deposited over the spacer layer 640. The amorphous layers 696, 698 may be, for example, 15 Å layer of $Al_2O_3$. It is important that $Al_2O_3$ does not coat the free layer edge. The hard bias 670, 672 layers and leads 680, 682 should be in electrical contact with the free layer 650. Other conducting magnetic and non-magnetic materials are possible with other embodiments of the present invention. The amorphous layers 696, 698 stop the epitaxial growth between the self-pinned underlayers 630 and the seed 692, 694/hard bias 670, 672 layers. The amorphous layers 696, 698 thus provide a higher $H_c$ for the hard bias layers.

The seed layers 692, 694 are provided at each side of the structure 600d. The hard bias layers 670, 672 are formed on the seed layers 692, 694. The hard bias layers 670, 672 then abut the free layer 650. Leads 680, 682 are formed on the hard bias layers 670, 672. The hard bias layers 670, 672 are electrically connected to the free layer 650 allowing sense current ($I_S$) to pass through the free layer. The self-pinned layer 630 extends under the hard bias layers 670, 672 and the free layer 650 disposed between the hard bias layers 670, 672 in the abutted junction head 600d.

Figure 7A:
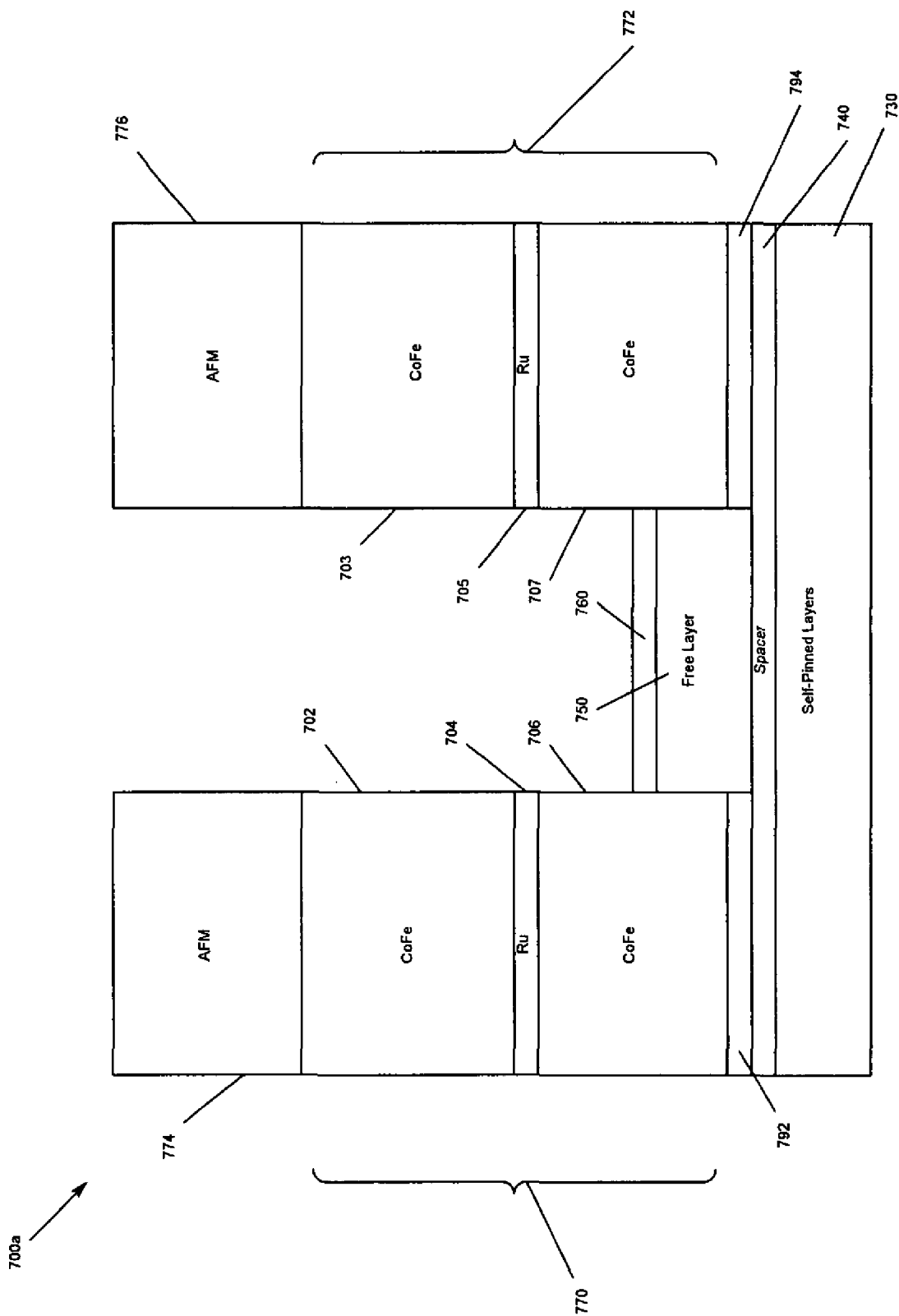
FIG. 7*a* illustrates a self-pinned abutted junction head structure with extended self-pinned layers according to another embodiment of the present invention.

FIG. 7a illustrates a self-pinned abutted junction head structure 700a with extended self-pinned layers according to another embodiment of the present invention. In FIG. 7a, seed layers 792, 794 are provided for the hard bias layers 770, 772. The hard bias layers 770, 772 then are disposed at the side of the free layer 750. The hard bias layers 770, 772 may be magnetically pinned or oriented by an anti-ferromagnetic (AFM) layers 774, 776.

Sense current passes through the free layer 750. The self-pinned layer 730 extends under the hard bias layers 770, 772 and the free layer 750 disposed between the hard bias layers 770, 772 in the abutted junction head 700a. The free layer 750 is able to dissipate heat due to normal operation and ESD to the cooler operating self-pinned layer 730. The length of the free layer 750 determines a track width of a written track.

The hard bias layers 770, 772 are disposed proximate to the free layer 750. However, higher thermal stability and higher pinning fields for the hard bias layers 770, 772 by coupling the first bias layers 706, 707 to the free layer 750, but moving the second bias layers 702, 703, which form the anti-parallel (AP) system with the first bias layers 706, 707, away from the free layer 750. The two bias layers 706, 707 and 702, 703, respectively have an interlayer 704, 705, e.g., Ruthenium (Ru), disposed therebetween. Thus, even with when the first bias layers 706, 707 and the second bias layers 702, 703 have the same thickness, there is a net longitudinal bias on the free layer 750. A spacer 740 separates the free 750 and self-pinned 730 layers. A cap 760 is provided over the free layer 750.

Figure 7B:
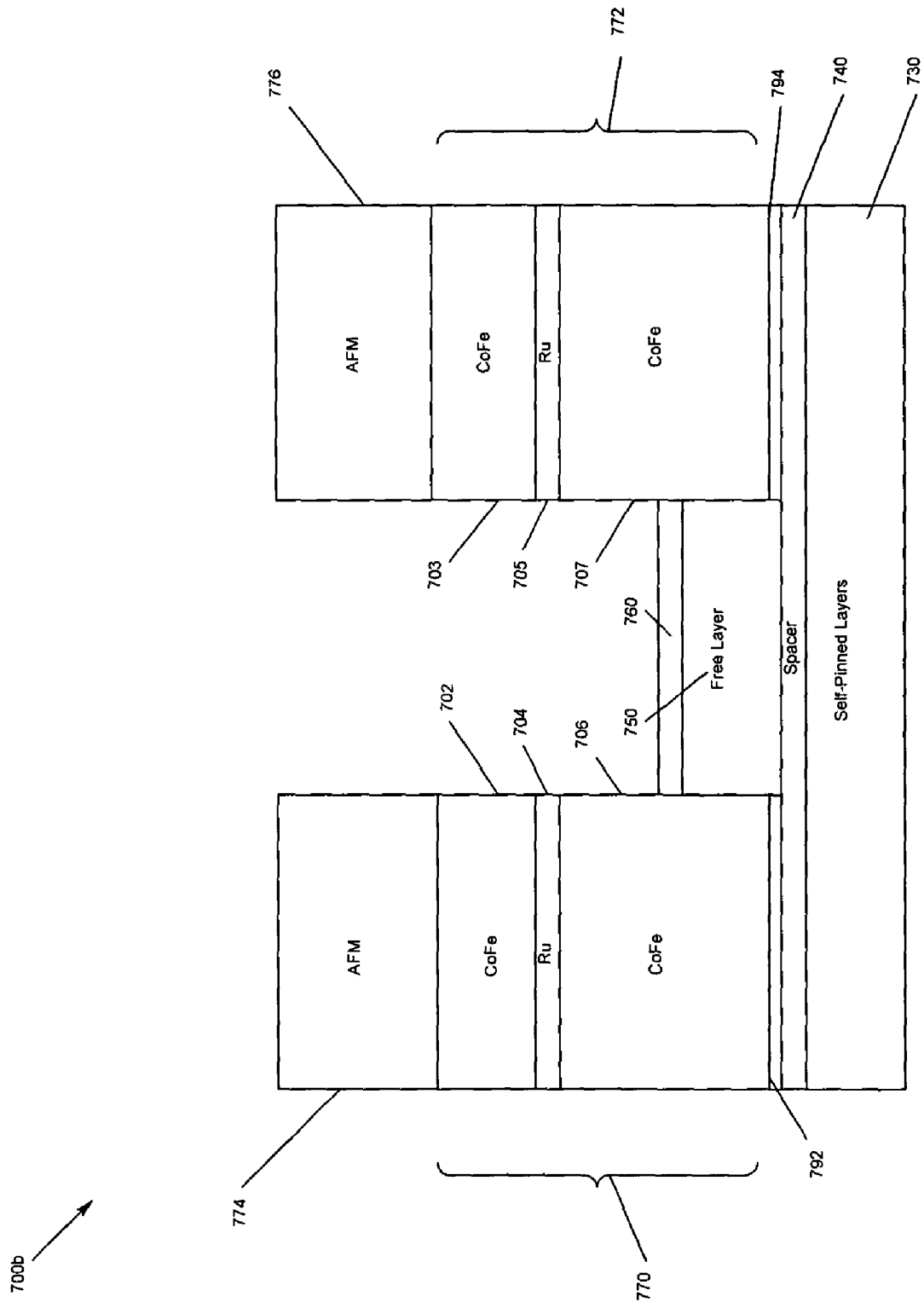
FIG. 7*b* illustrates a self-pinned abutted junction head structure with extended self-pinned layers according to another embodiment of the present invention.

FIG. 7b illustrates a self-pinned abutted junction head structure 700a with extended self-pinned layers according to another embodiment of the present invention. FIG. 7b is the same structure as shown in FIG. 7a, except the second bias layers 702, 703 are formed with a thickness less than the thickness of the first bias layers 706, 707. In FIG. 7b, the thickness of the first bias layers 706, 707 is approximately twice the thickness of the second bias layers 702, 703. By forming the first bias layers 706, 707 with a greater thickness than the thickness of the second bias layers 702, 703, etching into the first bias layers 706, 707 may be performed outside the active area where the free layer 750 is formed. Nevertheless, the pinning is unchanged.

Figure 8:
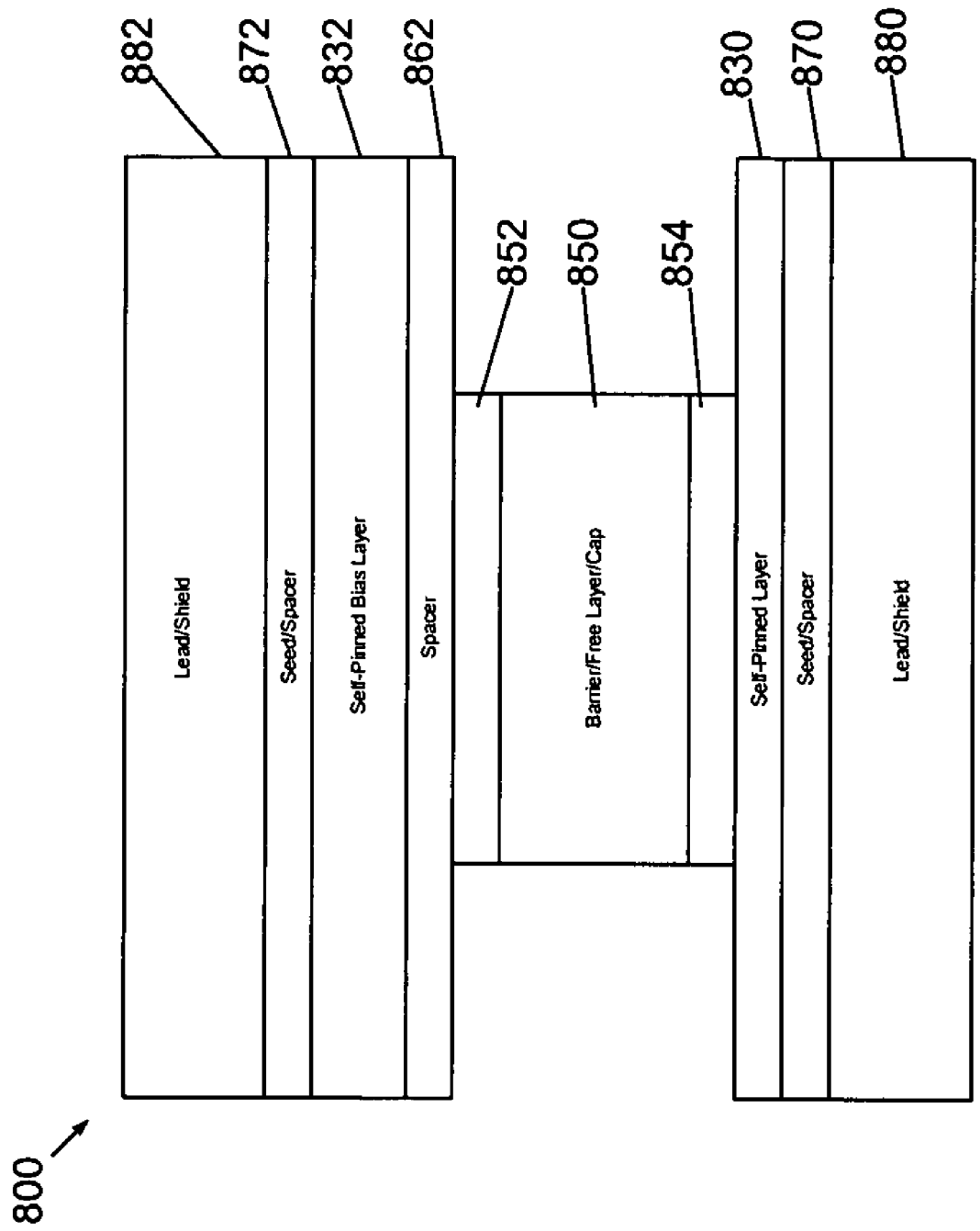
FIG. 8 illustrates a tunnel valve having larger self-pinning for the tunnel valve layers and the in-stack bias layers according to an embodiment of the present invention.

FIG. 8 illustrates a sensor having in-stack bias layers 800 according to an embodiment of the present invention. In FIG. 8, leads 880, 882 are formed on the seed/spacer layers 870, 872. A self-pinned layer 830 is formed adjacent to seed/spacer layer 870 and a self-pinned bias layer 832 is formed adjacent seed/spacer layers 870. The free layer 850 is disposed between barrier/cap layers 852, 854 wherein sense current ($I_S$) passes through the free layer 850. Moreover, the free layer 850 is disposed between self-pinned layer 830 and self-pinned bias layer 832.

The magnetization of a layer is defined by the magnetic moment per unit volume. The parallel pin states of the electrons in a layer determine the net magnetic moment. A domain is one region of material having only one direction of magnetization. The magnetic domain for a given volume and thermal temperature may reorient so as to minimize the total energy. By increasing the volume of a layer, the thermal stability may be increased. In FIG. 8, the self-pinned bias layer 832 is made to have an increased volume by extending beyond the width of the free layer 850. Because the width of the free layer determines the trackwidth, the self-pinned bias layer 832 may be extended to provide increased thermal stability without having an affect on the trackwidth.

The self-pinned bias layer 832 has a spacer 862 formed between it and the free layer 850. Thus, sensor 800 with an extended self-pinned bias layer generates larger stress anisotropy for the self-pinned layer 830 and the self-pinned bias layer 832. The magnetostriction for the self-pinned layer 830 is chosen to be large positive and the magnetostriction for the self-pinned bias layer 832 is chosen to be large negative.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A self-pinned abutted junction magnetic read sensor, comprising:
    a free layer for sensing magnetic fluctuations;
    first hard bias layers abutting the free layer;
    second hard bias layers, formed over the first hard bias layers discontiguous from the free layer, a magnetization of the second hard bias layers being anti-parallel to a magnetization of the first hard bias layers, the first and second hard bias layers providing a net longitudinal bias on the free layer; and a self-pinned layer, the self-pinned layer having a first end, a second end and central portion, wherein the central portion is aligned with the free layer and the first hard bias layers are formed over the first and second ends of the self-pinned layer.

2. The sensor of claim 1, wherein the first hard bias layers is formed with a thickness substantially equal to a thickness of the second hard bias layers.

3. The sensor of claim 1, wherein the first hard bias layers is formed with a thickness greater than a thickness of the second hard bias layers.

4. The sensor of claim 1 further comprising interlayers disposed between the first and second hard bias layers.

5. The sensor of claim 1 further comprising a spacer layer formed over the self-pinned layer and a first and second seed layer formed between the first and second hard bias layer and the spacer layer.

6. The sensor of claim 5 further comprising amorphous layers formed between the spacer and the first and second seed layers, the amorphous layer stopping epitaxial growth between the self-pinned layer and the first and second hard bias layers.

7. The sensor of claim 1 further comprising amorphous layers formed between the self-pinned layer and the first and second hard bias layers for stopping epitaxial growth between the self-pinned layer and the first and second hard bias layers.

8. The sensor of claim 1 further comprising first and second leads formed over the first and second hard bias layers.

9. The sensor of claim 1, wherein the free layer further comprises a length selected for a desired track width.

10. A magnetic storage system, comprising:
a moveable magnetic storage medium for storing data thereon;
an actuator positionable relative to the moveable magnetic storage medium; and
a magnetoresistive sensor, coupled to the actuator, for reading data from the magnetic recording medium when position to a desired location by the actuator, wherein the magnetoresistive sensor further comprises:
a free layer for sensing magnetic fluctuations;
first hard bias layers abutting the free layer;
second hard bias layers, formed over the first hard bias layers discontiguous from the free layer, a magnetization of the second hard bias layers being anti-parallel to a magnetization of the first hard bias layers, the first and second hard bias layers providing a net longitudinal bias on the free layer; and
a self-pinned layer, the self-pinned layer having a first end, a second end and central portion, wherein the central portion is aligned with the free layer and the first hard bias layers are formed over the first and second ends of the self-pinned layer.

11. The magnetic storage system of claim 10, wherein the first hard bias layers is formed with a thickness substantially equal to a thickness of the second hard bias layers.

12. The magnetic storage system of claim 10, wherein the first hard bias layers is formed with a thickness greater than a thickness of the second hard bias layers.

13. The magnetic storage system of claim 10 further comprising interlayers disposed between the first and second hard bias layers.

14. The magnetic storage system of claim 10 further comprising a spacer layer formed over the self-pinned layer and a first and second seed layer formed between the first and second hard bias layer and the spacer layer.

15. The magnetic storage system of claim 14 further comprising amorphous layers formed between the spacer and the first and second seed layers, the amorphous layer stopping epitaxial growth between the self-pinned layer and the first and second hard bias layers.

16. The magnetic storage system of claim 10 further comprising amorphous layers formed between the self-pinned layer and the first and second hard bias layers for stopping epitaxial growth between the self-pinned layer and the first and second hard bias layers.

17. The magnetic storage system of claim 10 further comprising first and second leads formed over the first and second hard bias layers.

18. The magnetic storage system of claim 10, wherein the free layer further comprises a length selected for a desired track width.

19. A self-pinned abutted junction magnetic read sensor, comprising:
first means for sensing magnetic fluctuations;
first bias means abutting the first means on opposite sides of the first means;
second bias means, formed over the first bias means discontinguous from the first means for sensing magnetic fluctuations, a magnetization of the second bias means being anti-parallel to a magnetization of the first bias means, the first and second bias means providing a net longitudinal bias on the first means for sensing magnetic fluctuations; and
a self-pinned layer, the self-pinned layer having a first end, a second end and central portion, wherein the central portion is aligned with the first means for sensing magnetic fluctuations and the first bias means are formed over the first and second ends of the self-pinned layer.

20. A magnetic storage system, comprising:
a moveable magnetic storage means for storing data thereon;
an actuator positionable relative to the moveable magnetic storage medium; and
a magnetoresistive sensor, coupled to the actuator, for reading data from the magnetic recording medium when position to a desired location by the actuator, wherein the magnetoresistive sensor further comprises:
first means for sensing magnetic fluctuations;
first bias means abutting the first means on opposite sides of the first means;
second bias means, formed over the first bias means discontinguous from the first means for sensing magnetic fluctuations, a magnetization of the second bias means being anti-parallel to a magnetization of the first bias means, the first and second bias means providing a net longitudinal bias on the first means for sensing magnetic fluctuations; and
a self-pinned layer, the self-pinned layer having a first end, a second end and central portion, wherein the central portion is aligned with the first means for sensing magnetic fluctuations and the first bias means are formed over the first and second ends of the self-pinned layer.

* * * * *